(12) United States Patent
Lee et al.

(10) Patent No.: US 7,905,123 B2
(45) Date of Patent: Mar. 15, 2011

(54) BICYCLE LOCK

(75) Inventors: Sen-Yung Lee, Tainan (TW); Ting-Wei Lin, Tainan (TW)

(73) Assignees: Sen-Yun Lee, Tainan (TW); Ting-Wei Lin, Tainan (TW); Holageo Enterprise Co., Ltd., Tainan County (TW)

( * ) Notice: Subject to any disclaimer, the term of this patent is extended or adjusted under 35 U.S.C. 154(b) by 206 days.

(21) Appl. No.: 12/379,452

(22) Filed: Feb. 23, 2009

(65) Prior Publication Data
US 2010/0212379 A1    Aug. 26, 2010

(51) Int. Cl.
*B60R 25/00* (2006.01)
(52) U.S. Cl. .............................. 70/227; 70/226; 70/233
(58) Field of Classification Search ............ 70/225–228, 70/233
See application file for complete search history.

(56) References Cited

U.S. PATENT DOCUMENTS

| | | | | |
|---|---|---|---|---|
| 542,507 A * | 7/1895 | Tafel | ............................. | 70/226 |
| 544,132 A * | 8/1895 | Shoots | ............................. | 70/227 |
| 570,521 A * | 11/1896 | Turton | ............................. | 70/227 |
| 583,638 A * | 6/1897 | Thomsen | ............................. | 70/227 |
| 590,609 A * | 9/1897 | Campbell | ............................. | 280/296 |
| 603,780 A * | 5/1898 | Wright | ............................. | 70/227 |
| 641,301 A * | 1/1900 | Klose | ............................. | 70/227 |
| 981,359 A * | 1/1911 | Balwick | ............................. | 70/227 |
| 1,194,034 A * | 8/1916 | Koch | ............................. | 70/227 |
| 1,218,336 A * | 3/1917 | Taralle | ............................. | 70/227 |
| 1,402,725 A * | 1/1922 | Pippen | ............................. | 70/227 |
| 1,654,017 A * | 12/1927 | Schlener | ............................. | 70/227 |
| 1,687,697 A * | 10/1928 | Soulliere | ............................. | 70/227 |
| 1,967,926 A * | 7/1934 | Dacosta | ............................. | 70/227 |
| 2,532,864 A * | 12/1950 | Theodorackis | ............................. | 70/227 |
| 4,180,998 A * | 1/1980 | Hellman | ............................. | 70/227 |
| 4,459,833 A * | 7/1984 | Waterkamp et al. | ............................. | 70/227 |
| D274,977 S * | 8/1984 | Devine | ............................. | D8/331 |
| 5,069,049 A * | 12/1991 | Shieh | ............................. | 70/227 |
| 5,564,297 A * | 10/1996 | Evers | ............................. | 70/227 |
| 5,628,214 A * | 5/1997 | Evers | ............................. | 70/227 |
| 5,956,983 A * | 9/1999 | Hughes | ............................. | 70/227 |
| 6,615,956 B1 * | 9/2003 | Chuang | ............................. | 188/24.18 |
| 7,631,525 B1 * | 12/2009 | Kennealy | ............................. | 70/227 |

* cited by examiner

*Primary Examiner* — Suzanne D Barrett
(74) *Attorney, Agent, or Firm* — Rosenberg, Klein & Lee (57) ABSTRACT

A bicycle lock includes a first part and a second part located close to bicycle wheels by two bolts and two respective protection members are connected to the first part and the second part respectively. The protection members cover the heads of the bolts so that the unauthorized person cannot access the bolts to detach the bicycle lock from the bicycle. A lock rod is connected to the first part which is pivotable about the bolt corresponding thereto so as to be inserted into the second part to lock the wheel.

6 Claims, 13 Drawing Sheets

BICYCLE LOCK

FIELD OF THE INVENTION

The present invention relates to a bicycle lock, and more particularly, to a bicycle lock that is easily cooperated with different types of bicycles and is not unlock from outside without permission.

BACKGROUND OF THE INVENTION

Bicycles are rapidly accepted by users of different ages and jobs because of high energy cost and environment concerns. Bicycles become a trend of healthy life and bicycles do not consume energy so that the market of bicycles grows fast. How to secure the bicycles when not in use is one of the most concerns when choosing bicycles as an alternative way for transportation. Most of the users will buy a lock to lock their bicycles on a fixed object such as a post or bicycle rails. The conventional bicycle locks do have their inherent drawbacks.

There are four types of the conventional bicycle locks, the first one is the U-shaped lock or cable lock. The U-shaped lock and the cable lock can be attached to the bicycle frame when riding and locked to the fixed object by extending a part of the locks through the wheels. However, these locks are not secured on the bicycle frame and easily hit or scrap the coating off. The second one is a fixed lock which is usually located on the seat stays and located above the rear wheel. A latch can be extended through the rear wheel to prevent the rear wheel from rotating. A key is used to unlock the fixed lock. Both of which are easily accessed by the thieves and are easily cut by using tool. The third one is located within the front fork and restricts the rotation of the handlebar to achieve the purpose of security of the bicycle. The fourth one is located within the seat tube and restricts the rotation of the crank. The third and fourth conventional bicycles locks cannot be removed from one bicycle to another, and they usually increase the manufacturing cost for the bicycles.

The present invention intends to provide a bicycle lock which has better anti-theft function and can be installed to any type of bicycles.

SUMMARY OF THE INVENTION

The present invention relates to a bicycle lock which comprises a first part and a second part, wherein the first part is connected to a first cantilever brake boss by a first bolt. A lug extends from an end of the first part. A first protection member is connected to the first part and includes an end piece which covers the first path and a head of the first bolt. Two extensions extend from the first protection member and the lug is located between the two extensions. A lock rod extends through a hole in the lug and two respective through holes in the two extensions. The first protection member and the lock rod are pivotable about the first bolt. The second part is connected to a second cantilever brake boss by a second bolt and includes a passage in which a lock core is received. A second protection member is connected to outside of the second part and includes a top portion which covers the second path and a head of the second bolt. A hook extends from a side of the second protection member and is inserted into the second part. The hook extends into the passage.

The bicycle lock further has a reinforcement plate connected across the two cantilever brake bosses the first and second bolts. The positioning plate is connected to the reinforcement plate and the lock rod is removably engaged with the positioning plate.

Another embodiment of the bicycle lock is provided and which comprises a first part connected to a first cantilever brake boss by a first bolt and a through hole is defined through the first part and perpendicularly communicates with the first part. A first threaded hole is defined in an underside of the first part and communicates with the first path and the through hole. A first protection member is threadedly connected to the first threaded hole. A lock rod extends through the through hole. A second part is connected to a second cantilever brake boss by a second bolt and includes a passage defined therein. A lock core is received in the passage. A second threaded hole is defined in an underside of the second part and communicates with the second path and the passage. A second protection member is threadedly connected to the second threaded hole.

The bicycle lock further has a reinforcement plate connected across the two cantilever brake bosses the first and second bolts. The positioning plate is connected to the reinforcement plate and the lock rod is removably engaged with the positioning plate.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
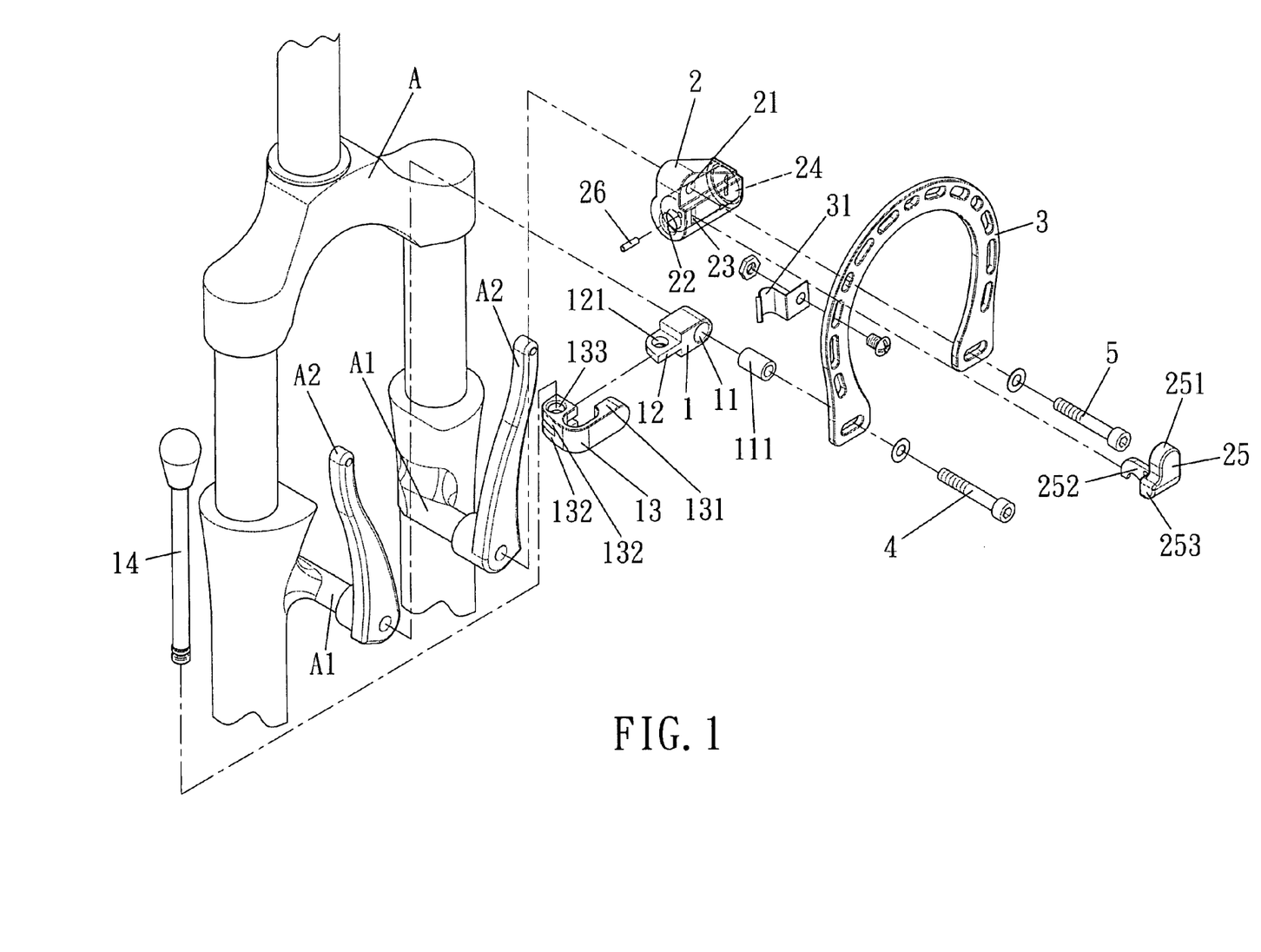
FIG. 1 is an exploded view to show the first embodiment of the bicycle lock of the present invention.
Figure 2:
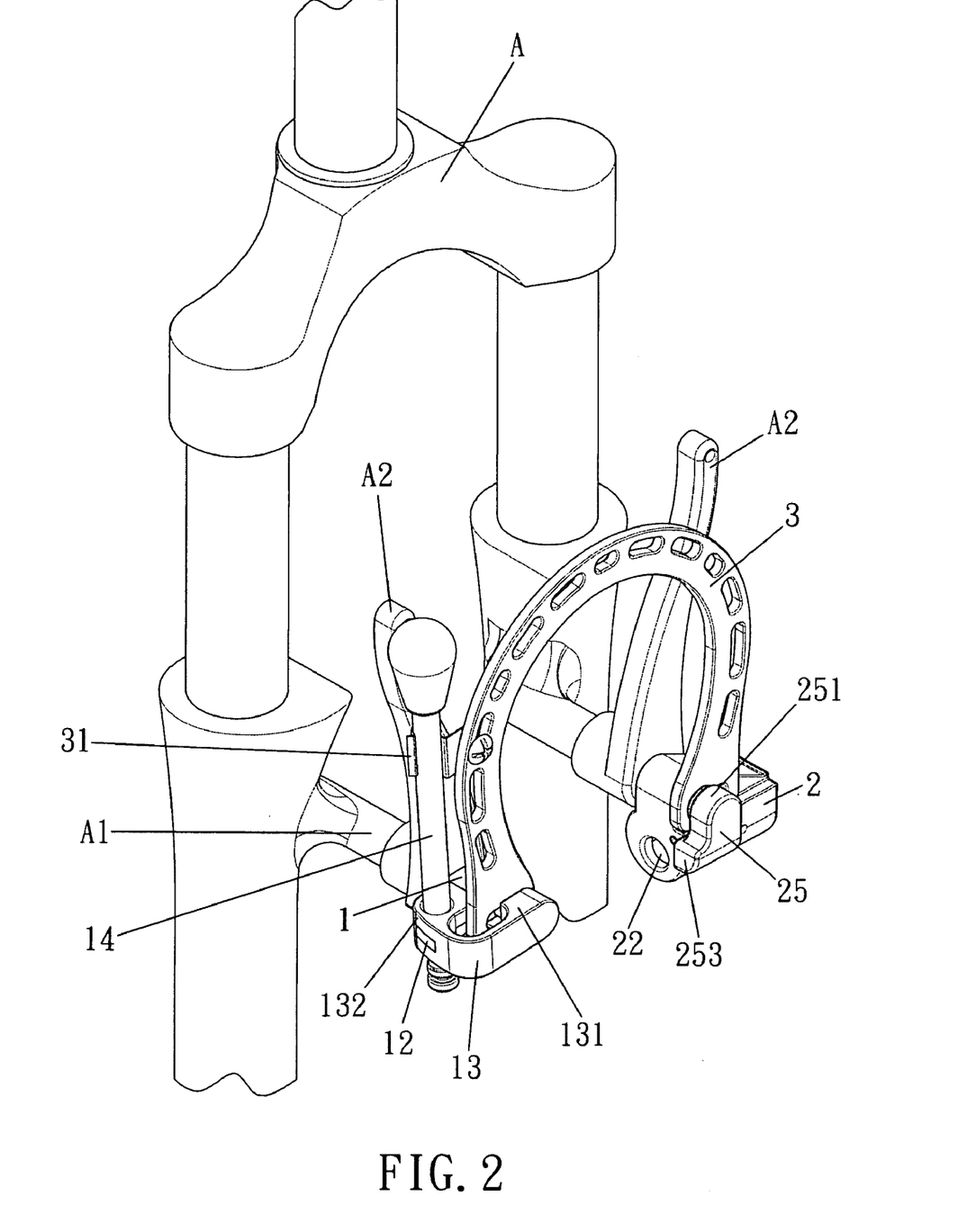
FIG. 2 is a perspective view to show the bicycle lock of the present invention.
Figure 3:
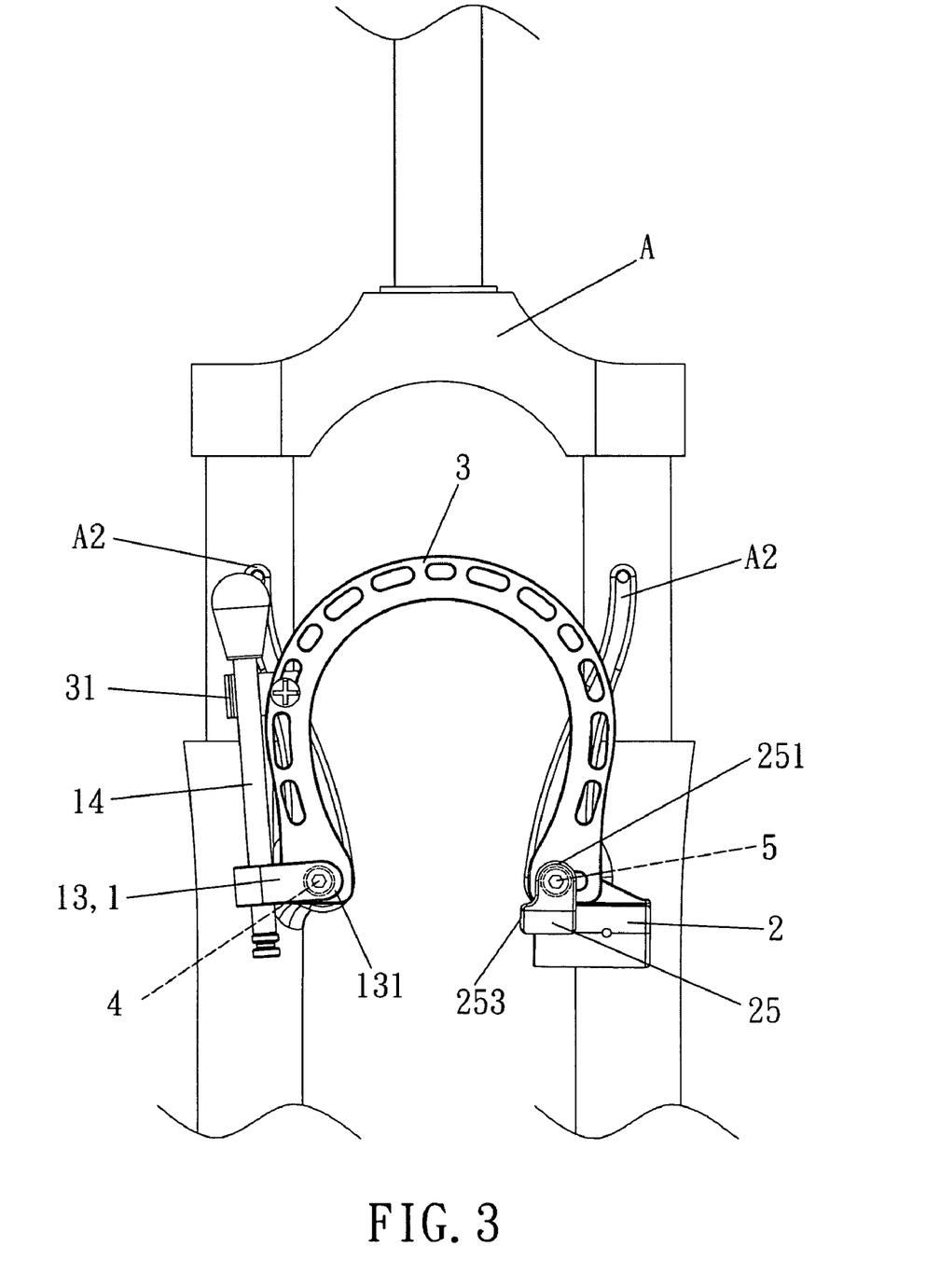
FIG. 3 is a front view of the bicycle lock of the present invention.

Referring to FIGS. 1 to 3, the bicycle lock of the present invention comprises a first part 1, a second part 2, a reinforcement plate 3 and a lock rod 14. The first part 1 is connected to a first cantilever brake boss A1 by extending a first bolt 4 through a first path 11 in the first part 1, the first cantilever brake boss A1 can be on the front fork A or the seat stays (not shown). The cantilever brake boss A1 is connected to a brake arm of the brake system. The bicycle lock can be installed close to the front wheel or the rear wheel (both not shown). A sleeve 111 is located in the first path 11 and a lug 12 extends from an end of the first part 1. The lug 12 extends in a direction parallel to the direction of the wheel rotates. A hole 121 is defined through the lug 12. A first protection member 13 is connected to the first part 1 and includes an end piece 131 which covers the first path 11 and a head of the first bolt 4. Two extensions 132 extend from the first protection member 13 and the lug 12 is located between the two extensions 132. Two respective through holes 133 are defined through the two extensions 132. A lock rod 14 extends through the hole 121 in the lug 12 and two respective through holes 133 in the two extensions 132. The first protection member 13 and the lock rod 14 are pivotable about the first bolt 4. The lock rod 14 extends perpendicular to the direction that the wheel moves.

The second part 2 is connected to a second cantilever brake boss A1 by extending a second bolt 5 through a second path 21 in the second part 2. The second cantilever brake boss A1 can be on the front fork A or the seat stays (not shown). The second part 2 includes a passage 22 defined therein and a lock core 24 received in the passage 22. An insertion hole 23 is defined in a side of the second part 2 and communicates with the passage 22. A second protection member 25 is connected to outside of the second part 2 and includes a top portion 251 which covers the second path 21 and a head of the second bolt 5. A hook 252 extends from a side of the second protection member 25 and inserted into the second part 2 via the insertion hole 23 and a pin 26 extends through the hook 252 to position the hook 252. The hook 252 extends into the passage 22. The second protection member 25 further includes an end wall 253 at an end thereof and the end wall 253 faces the first part 1.

A substantially U-shaped reinforcement plate 3 is connected across the two cantilever brake bosses A1 by the first and second bolts 4, 5, and a positioning plate 31 is connected to the reinforcement plate 3 and the lock rod 14 is removably engaged with the positioning plate 31.

Figure 4:
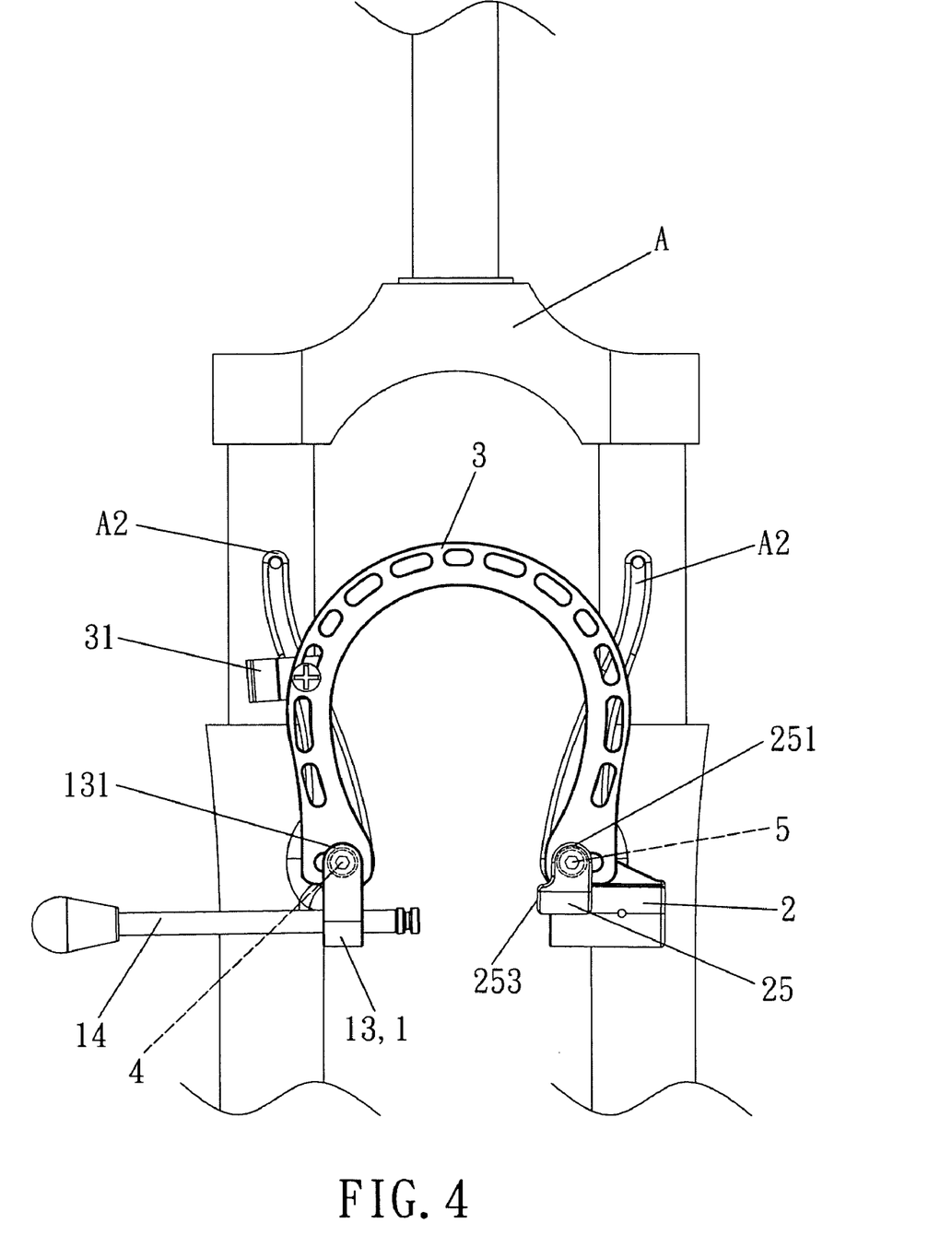
FIG. 4 shows that the lock rod is pivoted and to be inserted into the second part.
Figure 5:
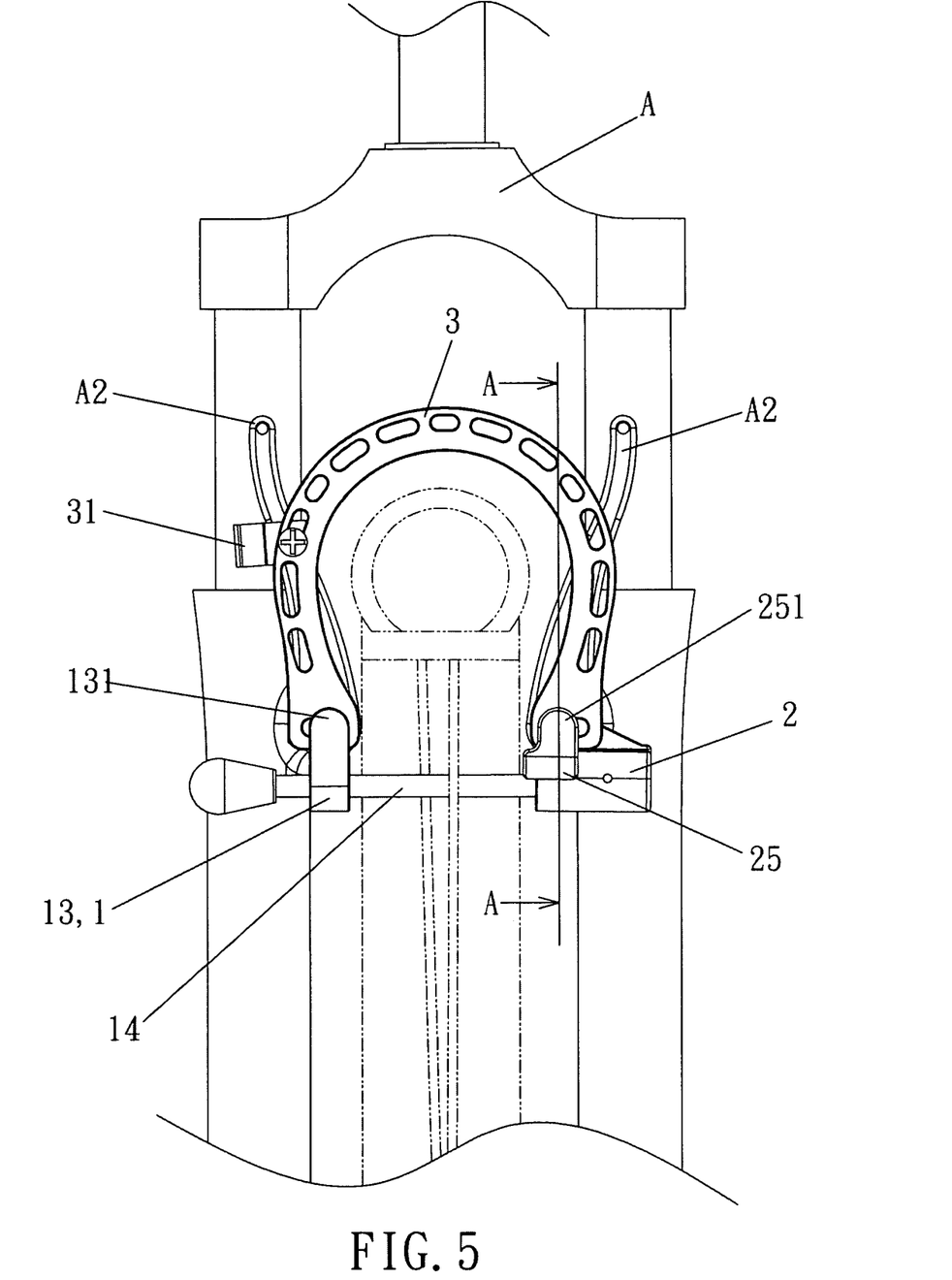
FIG. 5 shows that the lock rod is pivoted and inserted into the second part to lock the bicycle.
Figure 6:
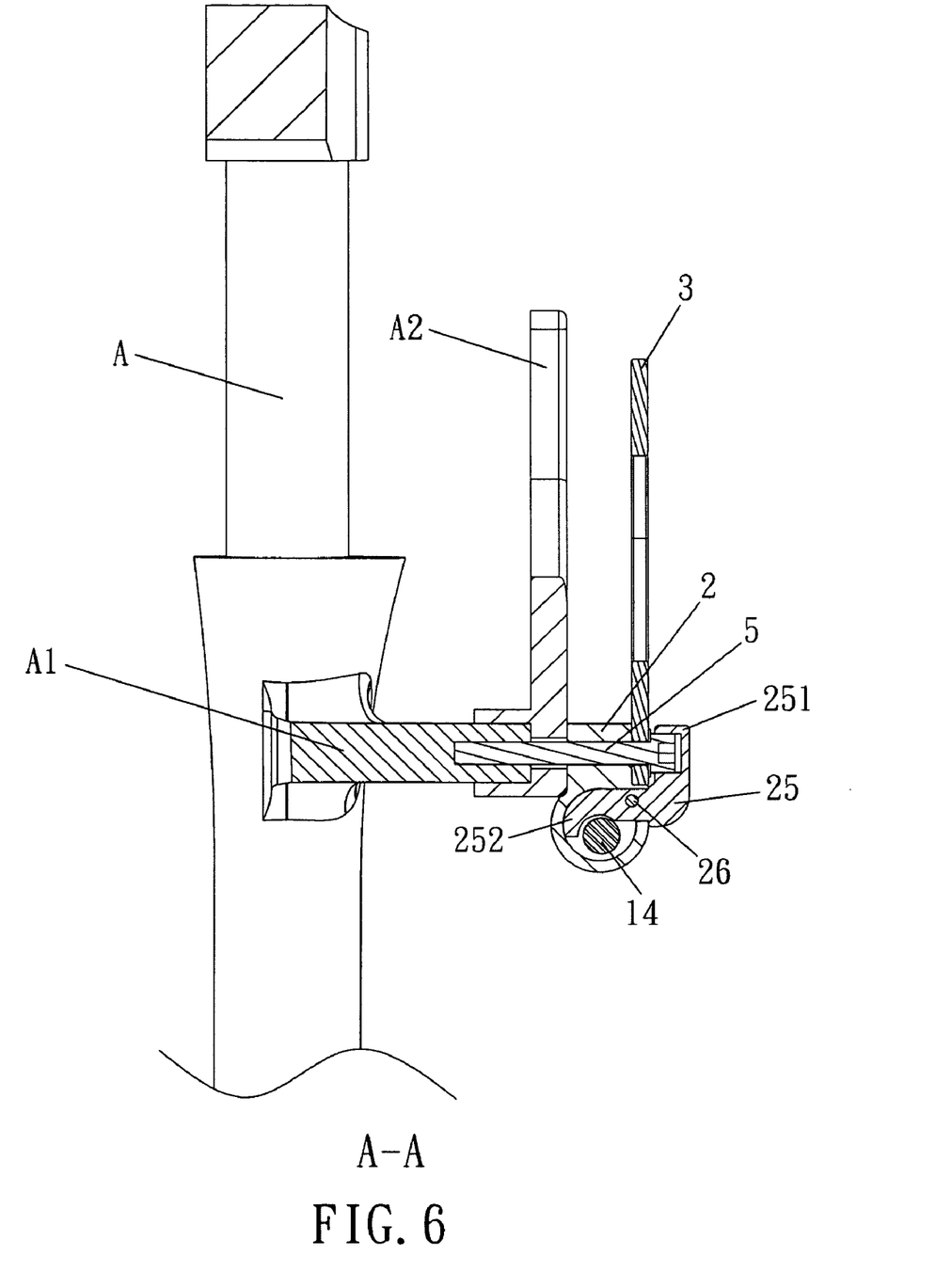
FIG. 6 is a cross sectional view taken along line A-A in FIG. 5.

Referring to FIGS. 4 to 6, when locking the bicycle lock, the user removes the lock rod 14 from the positioning plate 31 and pivots the first part 1, the first protection member 13 and the lock rod 14 about the first bolt 4, the lock rod 14 extends through the gap between spokes of the front or rear wheel and is inserted into the passage 22 of the second part 2. The hook 26 of the second protection member 25 is located above the lock rod 14 as shown in FIG. 6. Even if the pin 26 is broken or removed from the second part 2 by the thief, the hook 252 cannot be accessed because the lock rod 14 blocks the hook 252 so that the bicycle lock cannot be damaged.

When unlocking the bicycle lock, the user uses a key (not shown) to rotate the lock core 24 to allow the lock rod 14 to be removed from the passage 22 as shown the status in FIG. 4.

Figure 7:
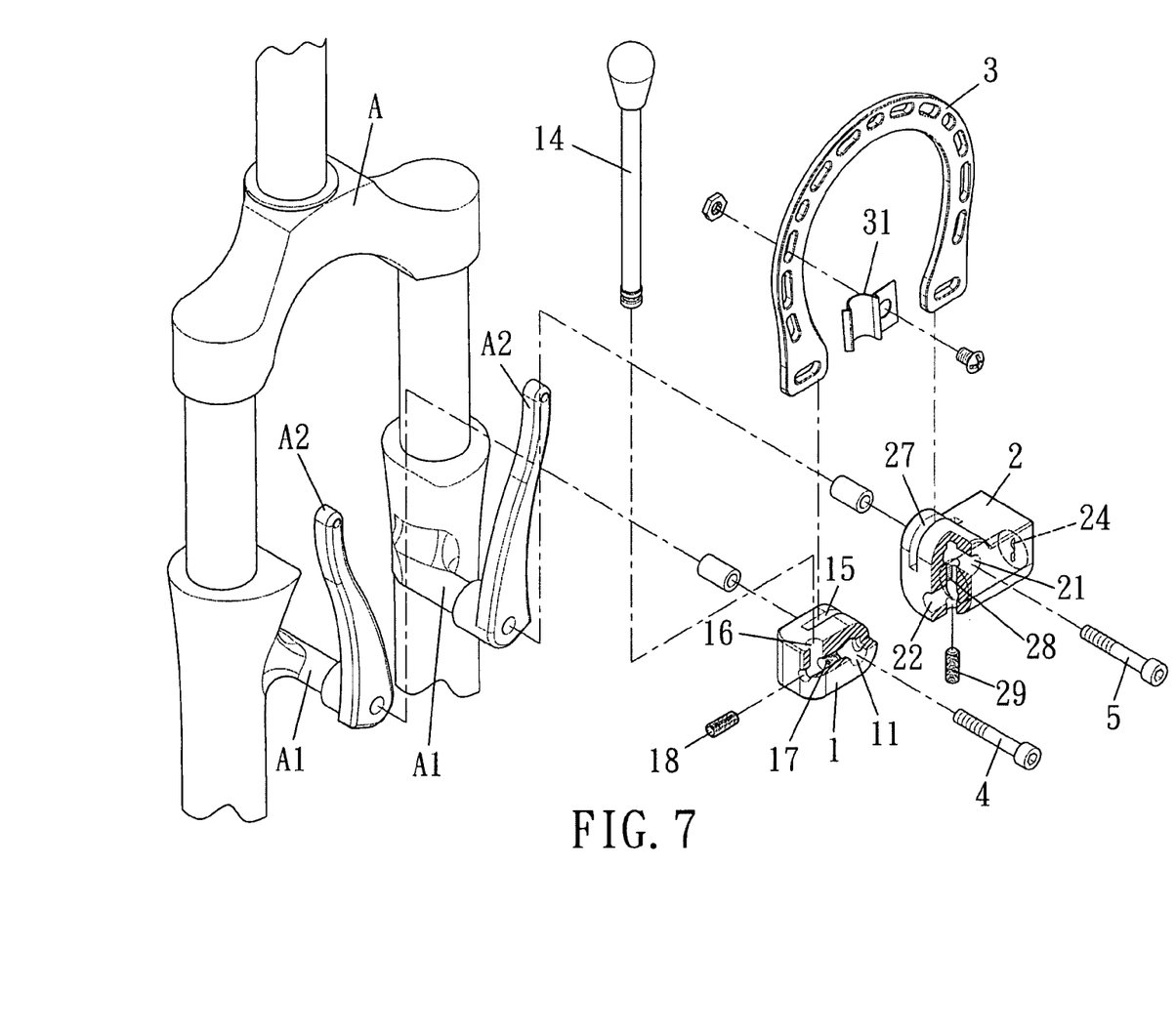
FIG. 7 is an exploded view to show the second embodiment of the bicycle lock of the present invention.
Figure 8:
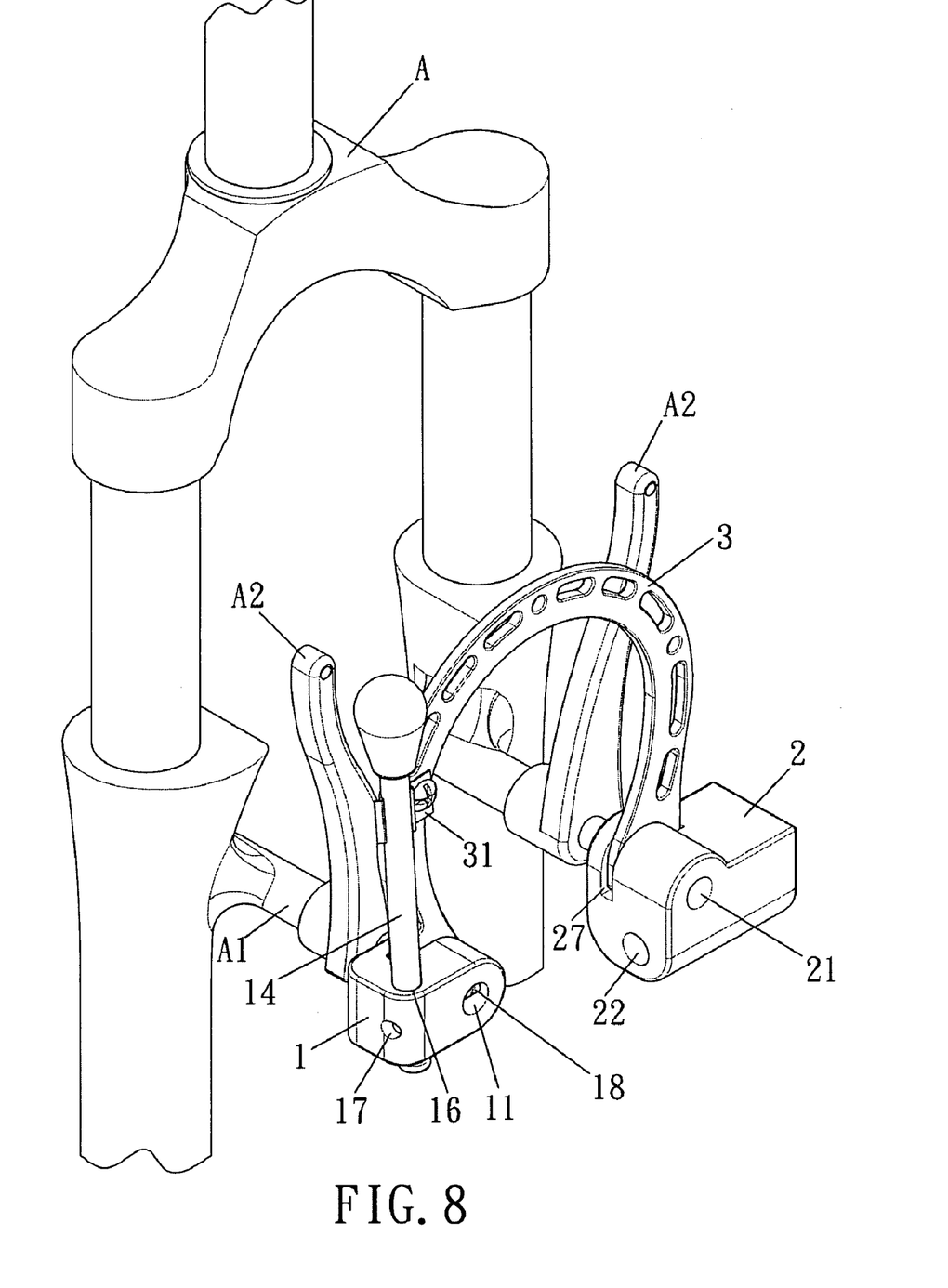
FIG. 8 is a perspective view to show the second embodiment of the bicycle lock of the present invention.
Figure 9:
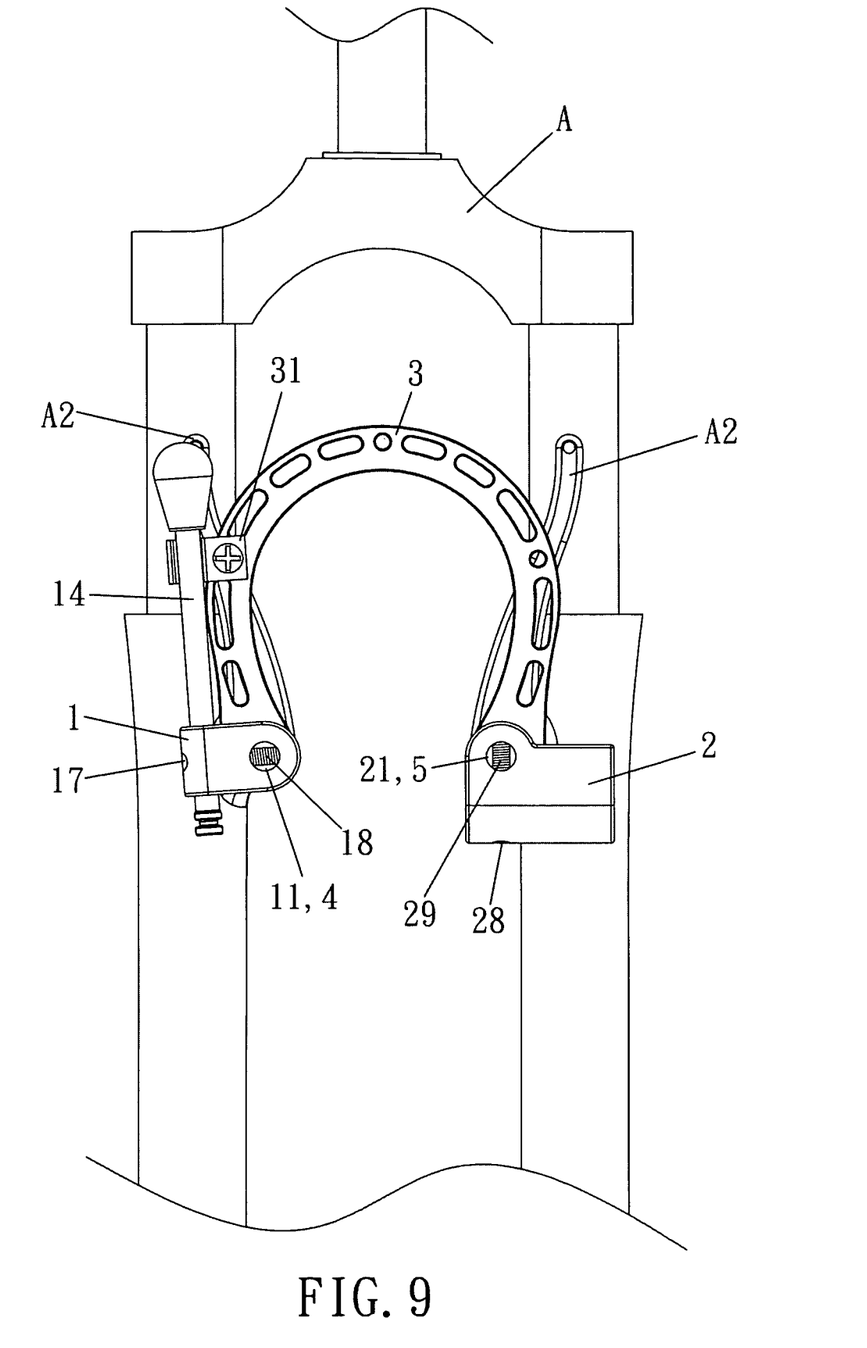
FIG. 9 is a front view of the second embodiment of the bicycle lock of the present invention.

FIGS. 7 to 9 show a second embodiment of the bicycle lock of the present invention, wherein the first part 1 is connected to the first cantilever brake boss A1 by extending a first bolt 4 through a first path 11 in the first part 1. A through hole 16 is defined through the first part 1 and perpendicularly communicates with the first part 11. A first threaded hole 17 is defined in an underside of the first part 1 and communicates with the first path 11 and the through hole 16. A first protection member 18 is threadedly connected to the first threaded hole 17. A lock rod 14 extends through the through hole 16. A first slot 15 is defined in a top of the first part 1.

The second part 2 is connected to a second cantilever brake boss A1 by extending a second bolt 5 through a second path 21 in the second part 2. The second part 2 includes a passage 22 defined therein and a lock core 24 is received in the passage 22. A second threaded hole 28 is defined in an underside of the second part 2 and communicates with the second path 21 and the passage 22. A second protection member 29 is threadedly connected to the second threaded hole 28. A second slot 27 is defined in a top of the second part 27.

A substantially U-shaped reinforcement plate 3 has its two ends inserted into the first and second slots 15, 27 which are in communication with the first and second paths 11, 21, the first and second bolts 4, 5 extending through the first and second paths 11, 21 and the two ends of the reinforcement plate 3 which is connected across the two cantilever brake bosses A1. A positioning plate 31 is connected to the reinforcement plate 3 and the lock rod 14 is removably engaged with the positioning plate 31.

Figure 12:
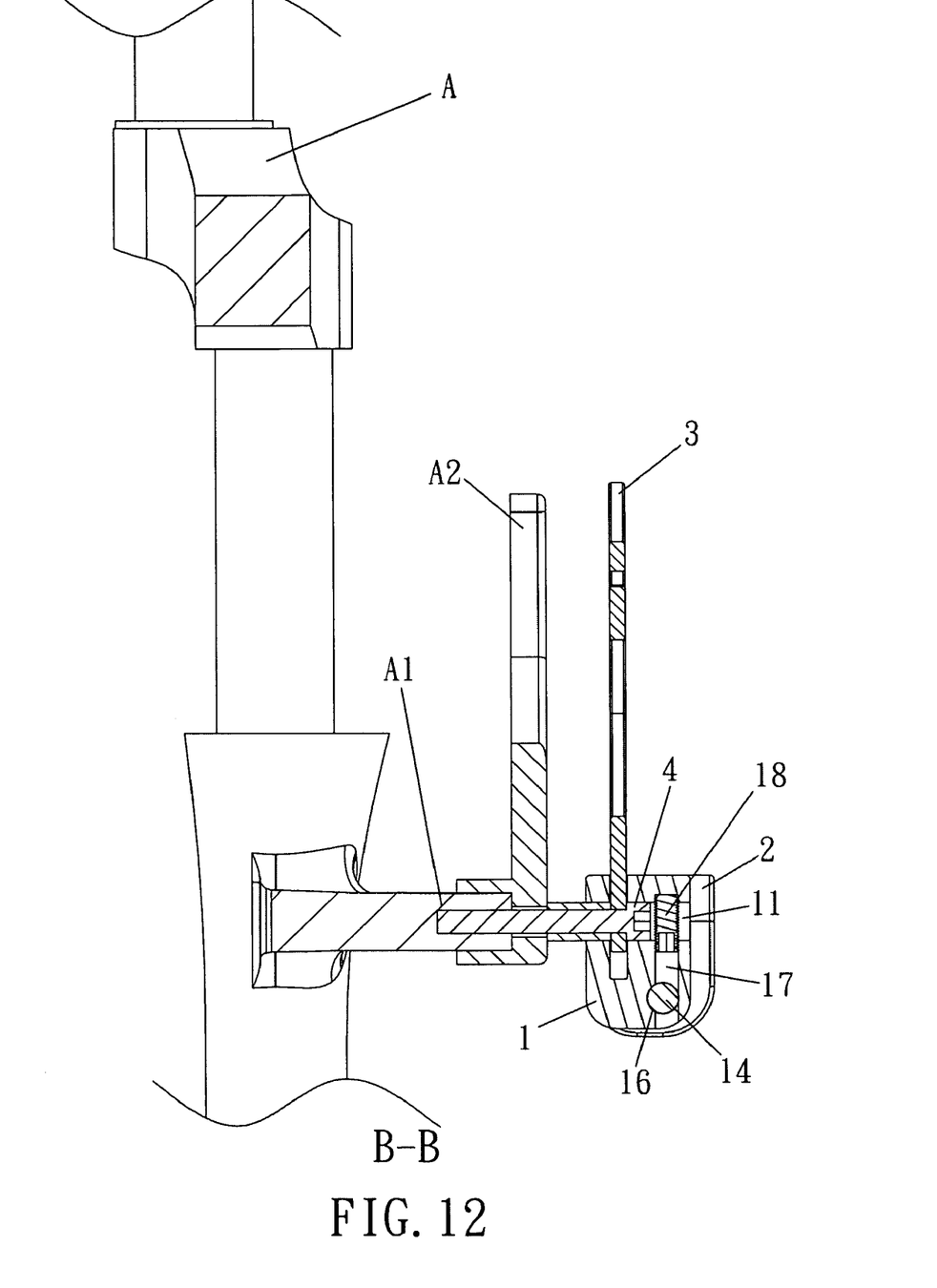
FIG. 12 is a cross sectional view taken along line B-B in FIG. 11.
Figure 13:
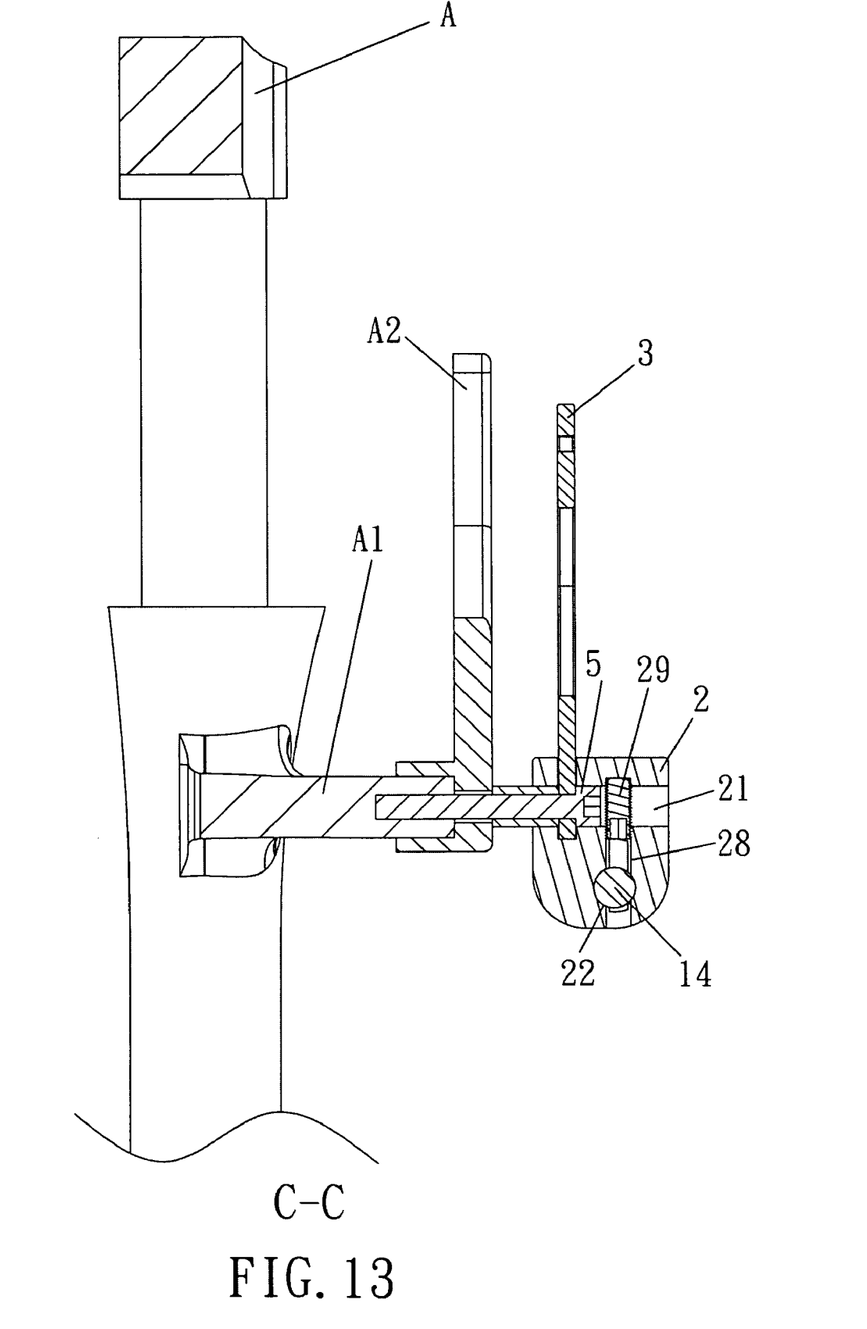
FIG. 13 is a cross sectional view taken along line C-C in FIG. 11.

As shown in FIGS. 10 to 13, when locking the bicycle lock, the user removes the lock rod 14 from the positioning plate 31 and pivots the first part 1 and the lock rod 14 about the first bolt 4. The lock rod 14 then extends through the gap between spokes of the front or rear wheel and is inserted into the passage 22 of the second part 2 to reach the locked status. In this embodiment, the first and second protection members 18, 29 are located outside of the first and second bolts 4, 5 as shown in FIG. 12, 13, so that the thief cannot use tool to access and damage. Besides, the thief cannot extend tool into the first and second threaded holes 17, 28 to damage the first and second protection members 18, 29 because the lock rod 14 blocks the first and second threaded holes 17, 28.

Figure 10:
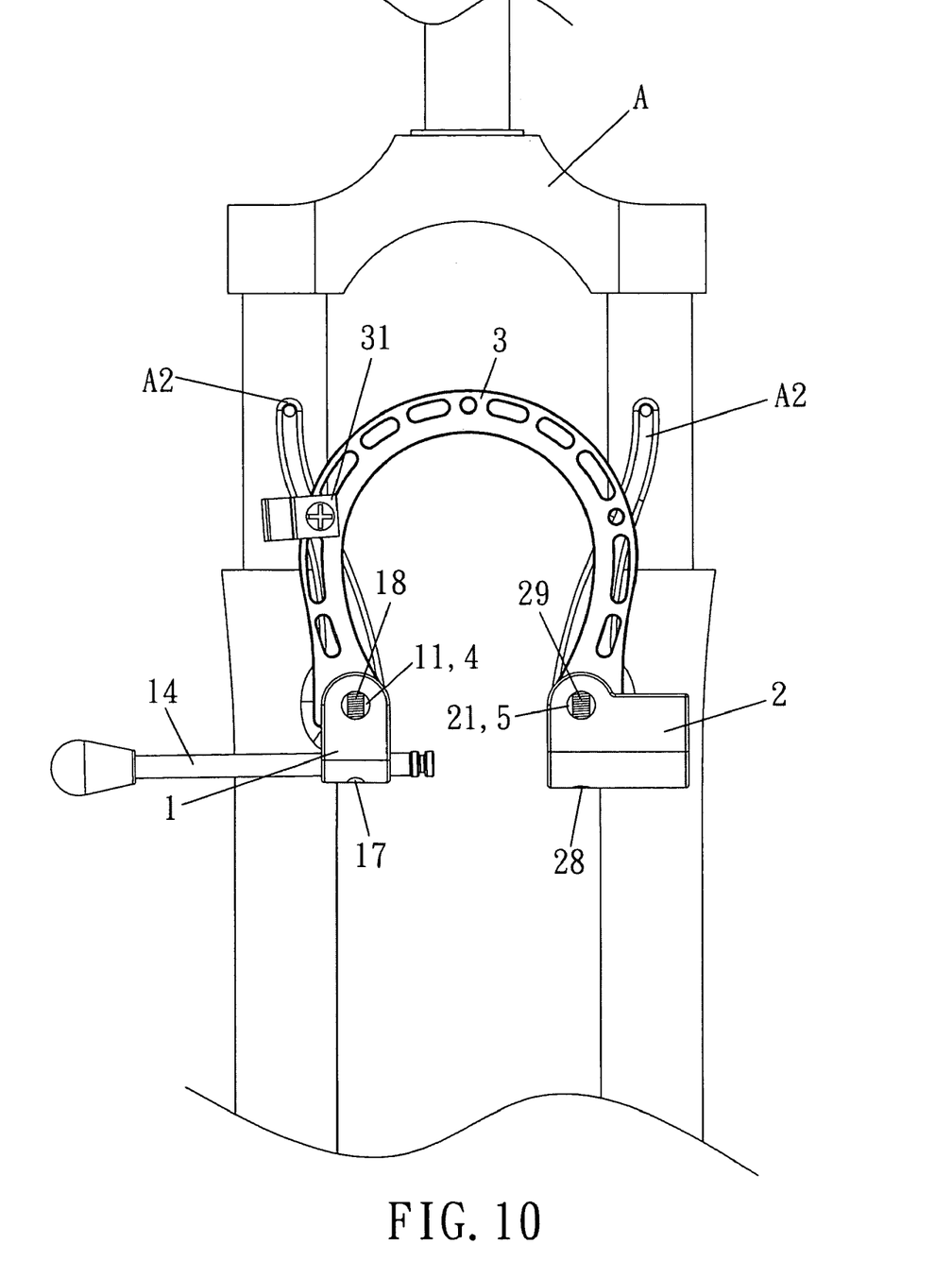
FIG. 10 shows that the lock rod in FIG. 9 is pivoted and to be inserted into the second part.
Figure 11:
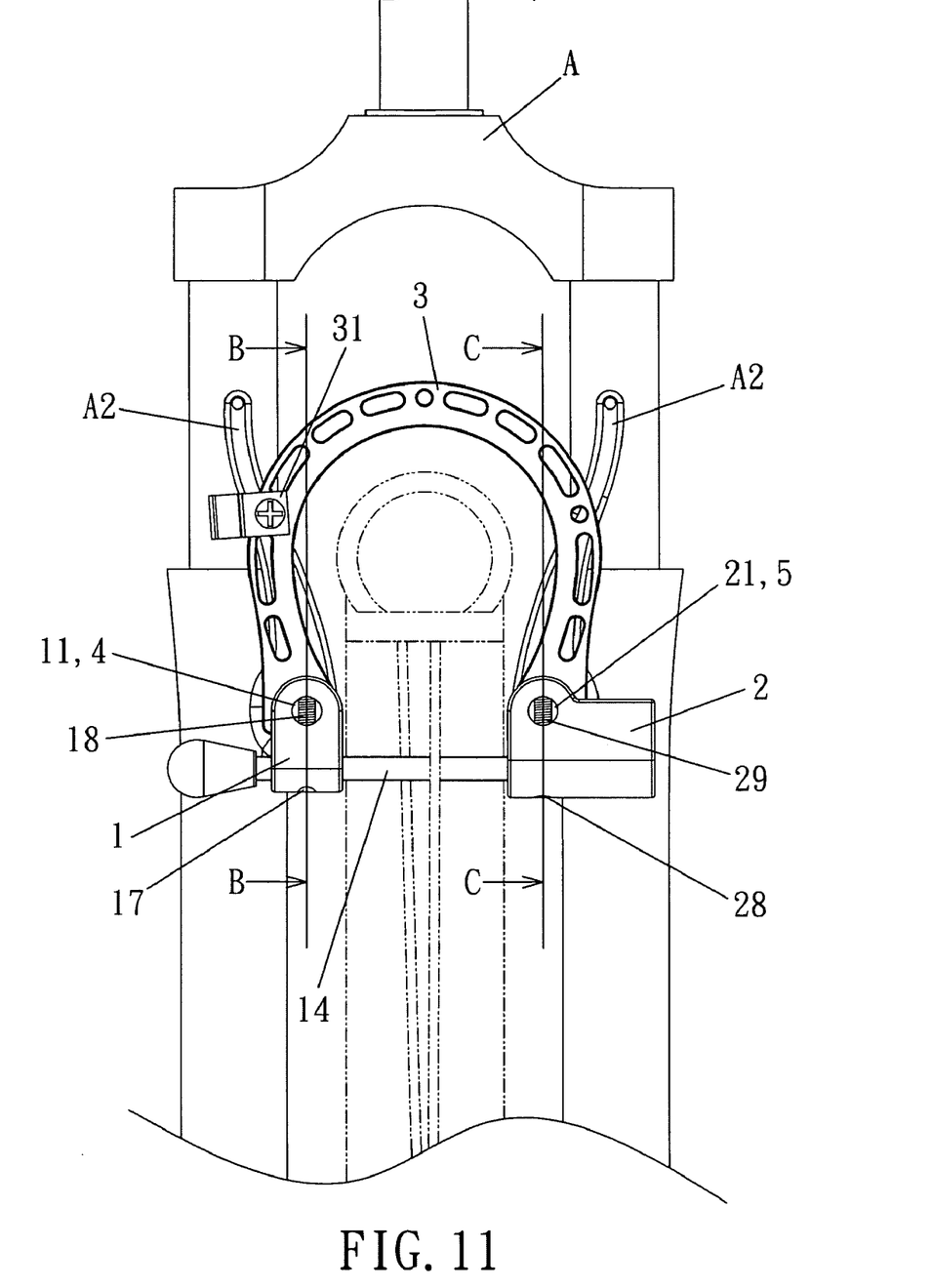
FIG. 11 shows that the lock rod in FIG. 10 is pivoted and inserted into the second part to lock the bicycle.

When unlocking the bicycle lock, the user uses a key (not shown) to rotate the lock core 24 to allow the lock rod 14 to be removed from the passage 22 as shown the status in FIG. 10.

The bicycle lock can be installed to any bicycle frame and the user can easily operate the bicycle lock by using a key. The bicycle lock is secured on the bicycle frame so that the coating of the bicycle frame does not scratched by any moving part of the bicycle lock. Besides, the bicycle lock is located on the two sides of the bicycle frame so as to keep a proper aesthetic purpose. The bicycle lock is connected to the bicycle frame by two bolts and this is easy and convenient to any users. The protection members block the first and second bolts from access from outside of the bicycle lock, so that there will be no place for the thief to break the bicycle lock. The reinforcement plate effectively prevents tools such as saw or pliers from entering the gap between the first and second parts to break the bicycle lock.

While we have shown and described the embodiment in accordance with the present invention, it should be clear to those skilled in the art that further embodiments may be made without departing from the scope of the present invention.

What is claimed is:

1. A bicycle lock comprising:

a first part connected to a first cantilever brake boss by extending a first bolt through a first path in the first part, a lug extending from an end of the first part, a first protection member connected to the first part and including an end piece which covers the first path and a head of the first bolt, two extensions extending from the first protection member and the lug located between the two extensions, a lock rod extending through a hole in the lug and two respective through holes in the two extensions, the first protection member and the lock rod being pivotable about the first bolt, and a second part connected to a second cantilever brake boss by extending a second bolt through a second path in the second part, the second part including a passage defined therein and a lock core received in the passage, a second protection member connected to outside of the second part and including a top portion which covers the second path and a head of the second bolt, a hook extending from a side of the second protection member and inserted into the second part via an insertion hole defined in a side of the second part, the hook extending into the passage whereby to lock the bicycle, the lock rod is pivotable about the first bolt so as to be inserted into the second part passage.

2. The bicycle lock as claimed in claim 1, wherein a reinforcement plate is connected across the two cantilever brake bosses by the first and second bolts.

3. The bicycle lock as claimed in claim 2, wherein a positioning plate is connected to the reinforcement plate and the lock rod is removably engaged with the positioning plate.

4. A bicycle lock comprising:

a first part connected to a first cantilever brake boss by extending a first bolt through a first path in the first part, a through hole defined through the first part and perpendicularly communicating with the first part, a first threaded hole defined in an underside of the first part and communicating with the first path and the through hole, a first protection member threadedly connected to the first threaded hole, a lock rod extending through the through hole, and a second part connected to a second cantilever brake boss by extending a second bolt through a second path in the second part, the second part including a passage defined therein and a lock core received in the passage, a second threaded hole defined in an underside of the second part and communicating with the second path and the passage, a second protection member threadedly connected to the second threaded hole whereby to lock the bicycle, the lock rod is pivotable about the first bolt so as to be inserted into the second part passage.

5. The bicycle lock as claimed in claim 4, wherein a reinforcement plate is connected across the two cantilever brake bosses by the first and second bolts.

6. The bicycle lock as claimed in claim 5, wherein a positioning plate is connected to the reinforcement plate and the lock rod is removably engaged with the positioning plate.

* * * * *